UNITED STATES PATENT OFFICE.

JOHN S. RIGBY, OF LIVERPOOL, COUNTY OF LANCASTER, ENGLAND, ASSIGNOR OF ONE-HALF TO ANDREW MACDONALD, OF SAME PLACE.

MANUFACTURE OF CEMENT FROM LIME-MUD.

SPECIFICATION forming part of Letters Patent No. 394,663, dated December 18, 1888.

Application filed March 12, 1888. Serial No. 267,031. (No specimens.) Patented in England July 22, 1887, No. 10,244.

*To all whom it may concern:*

Be it known that I, JOHN SAMUEL RIGBY, a subject of the Queen of Great Britain, residing at Liverpool, in the county of Lancaster, in the Kingdom of England, manufacturing chemist, have invented certain new and useful Improvements in the Manufacture of Cement from Lime-Mud, (for which I have obtained Letters Patent in Great Britain, No. 10,244, dated July 22, 1887,) of which the following is a specification.

In alkali (soda) works, both on the Le Blanc and the ammonia-soda process, vast quantities of a material known in England as "lime-mud" are thrown away as a waste product. Many attempts have been made to utilize this material; but owing to the presence in it of alkaline earth or of sulphides and other salts all these attempts have practically ended in failure.

Now, my invention consists in a method of utilizing this lime-mud by forming it into cement. I accomplish this by first eliminating or making innocuous the deleterious salts, and, secondly, by intimately mixing the lime-mud with aluminous materials—such as clay—in as fine a state of division as practicable, and in such proportions as are requisite for making Portland cement, or cement of the like nature, (these proportions are well understood by chemists and cement-manufacturers,) and, thirdly, by calcining, grinding, and exposing the material to the atmosphere.

In carrying out my invention I thoroughly wash the lime-mud with water, so as to extract the soluble salts as much as practicable. I then ascertain the nature and quantity of the salts remaining in the material. If the residual salts consist mainly of sulphides, I pass carbonic acid (preferably that obtained from the kiln used in burning the cement in the subsequent operation) through the lime-mud until sulphureted hydrogen is no longer given off. This can be done in the causticizer, if desired. If, however, the residual salts consist mainly of chlorides—such as chloride of magnesium or chloride of calcium—I add an alkaline silicate, preferably silicate of soda, in sufficient quantity to decompose the chloride and form silicate of the alkaline earth or earths, leaving chloride of sodium in solution, the chloride of sodium being a much less deleterious salt and much more easily eliminated in succeeding operations than the alkaline earthy chlorides. If on the other hand there be both chlorides and sulphides in the mixture, both the preceding operations should be performed successively. The lime-mud thus purified is mixed with finely-divided clay or other aluminous material ordinarily used for making cement in the proportions requisite to form the required cement, and when thoroughly mixed is dried, preferably by the waste heat from the kiln. It is then calcined in the kiln, just as in the case of Portland cement. The calcined material is then ground and exposed to the air on floors or otherwise, in the usual manner, and is then packed as cement.

When the lime-mud is obtained exclusively from causticizers used in Le Blanc soda-works, it will usually be found sufficiently purified by washing and treatment with carbonic acid. If from ammonia-soda works only, it will usually be sufficiently purified by washing and treatment with silicate of soda; but if it be obtained from a variety of sources the entire process above described must be gone through.

I claim as my invention—

1. The process of making cement from lime-mud, which consists in washing the same, treating it with carbonic acid till sulphureted hydrogen is no longer given off, then with sufficient alkaline silicate to decompose the alkaline-earth chlorides present, mixing it with clay in the right proportions to form cement, drying, calcining, grinding, and exposing it to air, substantially as described.

2. In the manufacture of cement from lime-mud, freeing the said lime-mud from sulphides by means of carbonic acid, mixing with clay, and calcining, substantially as described.

3. In the manufacture of cement from the lime-mud of the caustic-alkali manufacture, treating the mud while still in the causticizer with carbonic acid, whereby the compound of caustic lime and caustic soda is decomposed and carbonate of lime formed, from which the soda can easily be washed, and whereby, also, the sulphur is eliminated as sulphureted hydrogen, but prevented from escaping into the air by the causticizer.

4. In the manufacture of cement from lime-mud, converting the alkaline-earth chlorides into alkaline chlorides by means of an alkaline silicate, whereby an innocuous ingredient or ingredient volatile in the calcining-kiln is obtained instead of the obnoxious alkaline-earth chloride, and material containing the latter therefore can be utilized for cement manufacture.

5. The improvement in the process of making cement from lime-mud, which consists in calcining the cement materials and using the carbonic acid resulting from such calcination to form carbonated lime-mud from material containing lime not in combination with carbonic acid.

In testimony whereof I have signed my name to this specification in the presence of two subscribing witnesses.

JOHN S. RIGBY.

Witnesses:
WM. Q. THOMPSON,
ANDREW MACDONALD.